July 26, 1966  H. A. LEEDER, JR  3,263,123
FLASHER CIRCUIT FOR VEHICLES HAVING FLUORESCENT LIGHTS
Filed Feb. 25, 1964

INVENTOR.
HARRY A. LEEDER JR.
BY Richard von K. Burns
Atty.

United States Patent Office 3,263,123
Patented July 26, 1966

3,263,123
FLASHER CIRCUIT FOR VEHICLES HAVING FLUORESCENT LIGHTS
Harry A. Leeder, Jr., Skaneateles, N.Y., assignor to R. E. Dietz Company, Syracuse, N.Y., a corporation of New York
Filed Feb. 25, 1964, Ser. No. 347,138
4 Claims. (Cl. 315—209)

This invention relates generally to transistor oscillator circuits, and has particular reference to a flasher circuit for vehicles carrying auxiliary electrical equipment that causes severe pulsations in the electrical supply voltage.

Heavy duty trucks and buses require as many as 8 or more signal lights with a consequent current load of the order of 16 amperes which must be switched on and off by the flasher signal circuit. Many of these trucks and buses are also provided with auxiliary electrical equipment such as lights of the fluorescent variety which require an inverter to provide the high voltage alternating current necessary to illuminate the fluorescent material of the lights.

Even with an extra large battery the inverter may draw a heavy current and cause large pulsations in the voltage of the battery which makes it difficult to provide for a regular flash rate in the signal lights. In severe cases the minimum instantaneous voltage may be so low that an electronic flasher rated for the nominal battery voltage will not flash.

The primary object of the invention, accordingly, is to provide a transistorized oscillator circuit having a dependable and regular cycle and capable of switching comparatively heavy loads in a vehicle having auxiliary electrical equipment causing pulsations in the electrical supply voltage.

A further important object is to provide a stable and reliable flasher device capable of a constant rate of flash when used in conjunction with a power source having large pulsations in output voltage.

A still further object is to provide a transistorized oscillator circuit having means for smoothing out pulsations caused by an inverter used for supplying high voltage alternating electric current from a common battery to fluorescent lights.

Other objects and advantages will become apparent from the following description taken in conjunction with the accompanying drawing, in which.

Figure 1:
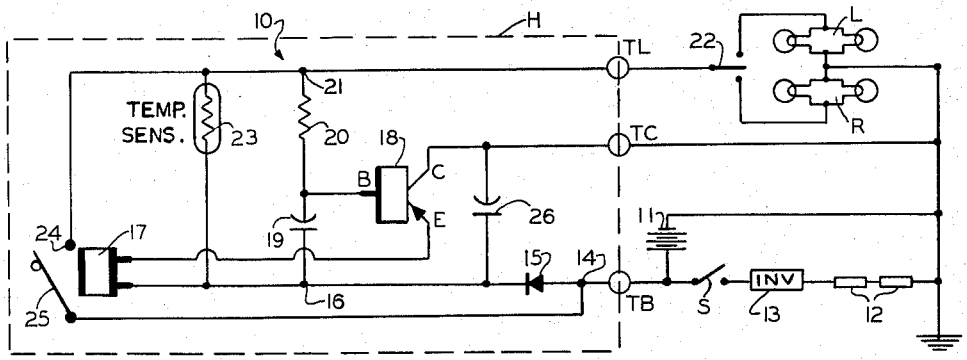
FIGURE 1 is a schematic circuit diagram of a transistor oscillator circuit arranged in accordance with the present invention and in which the vehicle battery ground is negative.

Referring more particularly to FIGURE 1, the flasher circuit 10 includes a source of direct current 11 which for the type of flasher contemplated is a 12 volt battery and which also supplies current for a plurality of fluorescent lamps 12 through a switch S and the inverter 13. The negative terminal of battery 11 is grounded in the frame of the vehicle and the other terminal is connected to a point of reference potential 14 in the circuit 10.

The reference point 14 is connected through the semiconductor diode 15 to another reference point 16. Reference point 16 is connected to the coil of a relay 17 and thence through the emitter E and collector C electrodes of a PNP transistor 18 to ground. Capacitor 19 is connected from reference point 16 to base B of transistor 18.

The base electrode B of transistor 18 is also connected through a resistor 20 to a reference point 21 which is connected to a turn switch 22 which may be manually operated to connect point 21 to ground through either the load L or load R according to the desired direction of turn. Loads L and R are each represented by a plurality of incandescent lamps in parallel, one side being connected to ground and the other to a terminal of the switch 22.

Although it is not necessary for the operation of the circuit, a second resistor 23 preferably is connected from reference point 16 to reference point 21 in parallel with capacitor 19 and resistor 20. Resistor 23 is temperature sensitive and prevents failure of the operation of the circuit at high temperatures.

The normally open contacts 24 and 25 of relay 17 are connected, respectively, to the points of reference 21 and 14. The cathode of diode 15 is connected by another capacitor 26 to the collector electrode C of transistor 18.

It will be understood that the components of the circuit 10 shown within the broken line rectangle H of FIGURE 1 are adapted to be enclosed in a box or housing which may be provided with a terminal TL connected to reference point 21 and adapted to be connected to the turn switch 22 as shown. Another terminal TC may be provided connected to the collector electrode C and adapted to be connected to ground and thus to the negative side of battery 11, and a third terminal TB connected to reference point 14 is adapted for easy connection to the positive terminal of the battery 11.

In operation, so long as switch S is open and as more fully explained in Patent 3,113,242, issued Dec. 3, 1963, to the same inventor, the circuit 10 is activated by closing the turn switch 22 and connecting reference point 21 with ground and the negative side of battery 11 through either load L or R. Battery voltage is applied to the base B of transistor 18 through load L or R and resistor 20. The capacitor 19 begins to charge and the voltage differential between base B and reference point 16 begins to increase.

Voltage at the emitter E equals the base voltage less the transistor base-emitter voltage drop and, as the voltage at base B rises the voltage across relay 17 rises also. Transistor 18 provides current amplification so that a small current in the base circuit can control a much larger current in relay 17. During the period when capacitor 19 is charging, the current through load L or R is relatively small and the lamps of load L or R do not light.

When the voltage across relay 17 reaches the operating or "pull-in" voltage of the relay, contacts 24 and 25 close and the full voltage of the battery is placed across the lamps of the load and they flash on. Reference point 21 is now connected directly to reference point 14 and capacitor 19 begins to discharge through resistor 20 and the relay contacts. The voltage at base B falls and the voltage at the emitter E follows the base voltage down and, when the voltage across the relay 17 reaches the "drop-out" voltage of the relay, the contacts 24 and 25 open and the lamps blink out. Resistor 23 is provided to further stabilize the operation of the circuit at high temperature.

As long as the turn switch 22 is closed the above described cycle is repeated and the lamps of load L or R blink on and off.

Figure 3:
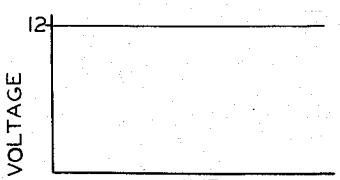
FIGURE 3 is an idealized voltage-time diagram illustrating the voltage in a normal lamp circuit supplied with pure direct current.
Figure 4:
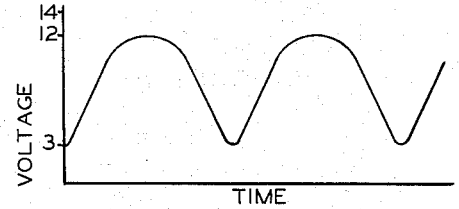
FIGURE 4 is a similar diagram illustrating the voltage across the battery in a conventional fluorescent lamp circuit including an inverter.

So long as switch S remains open the voltage across the battery 11 remains constant as illustrated in FIGURE 3 but, when switch S is closed and current flows through the inverter 13 and fluorescent lights 12, the voltage across the battery may have wide fluctuations or pulsations as illustrated in FIGURE 4. During these recurrent fluctuations the voltage may vary from a maximum of 14 volts to a minimum of 3 volts at a typical frequency of 8000 cycles per second, as indicated in FIGURE 4, and it will be apparent that the regular "pull-in" and "drop-out" of the relay 17 would be interrupted and disturbed were it not for the provision of diode 15 and capacitor 26.

Figure 5:
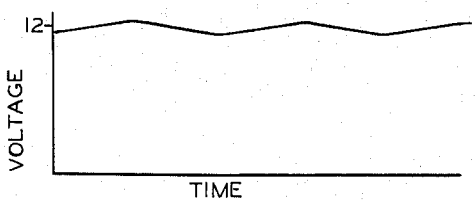
FIGURE 5 is a similar diagram illustrating the voltage in the flasher circuit of the present invention.

The diode 15 and capacitor 26 effectively filter out the extreme fluctuations in voltage. When the voltage in FIGURE 4 rises, capacitor 26 charges to approximately the peak voltage of the wave. When the voltage falls, diode 15 blocks the reverse current flow which would otherwise occur. The filtering action is illustrated in FIGURE 5 where a minor pulsation in voltage is still discernable but the voltage across capacitor 26 is relatively constant as compared to the wide fluctuations shown in FIGURE 4.

Figure 2:
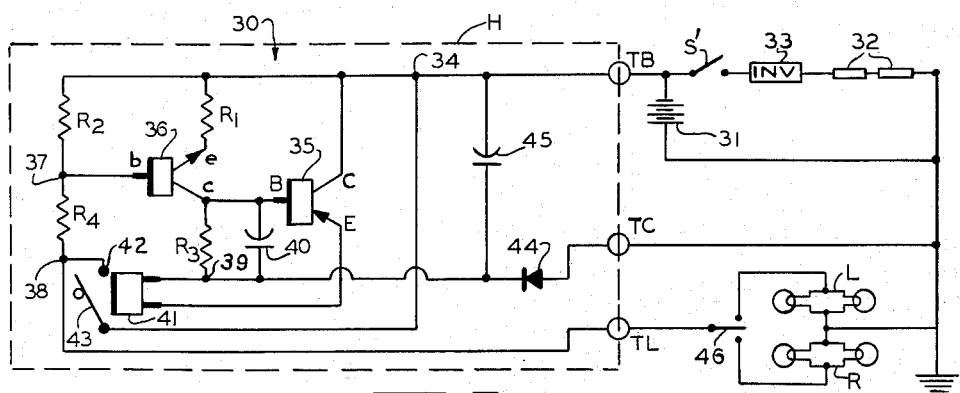
FIGURE 2 is a similar diagram in which the battery ground is positive.

Referring now to FIGURE 2 a similar circuit 30 may be provided for vehicles having fluorescent lamps powered by an inverter but having the power supply positive grounded. The power source battery 31 also supplies current to the fluorescent lamps 32—32 through the switch S' and inverter 33.

The positive terminal of battery 31 is grounded in the frame of the vehicle and the other terminal is connected to a point of reference potential 34 which, in turn, is connected to the collector electrode C of a PNP transistor 35 and through resistors R1 and R2, respectively, to the emitter electrode e of an NPN transistor 36 and to a reference point 37. Reference point 37, in turn, is connected to the base electrode b of transistor 36 and, through resistor R4, to reference point 38.

The collector electrode c of transistor 36 is connected through resistor R3 to a reference point 39 and is also connected to the base electrode B of transistor 35. Capacitor 40 is connected between base B of transistor 35 and reference point 39.

The emitter electrode E of transistor 35 is connected to one terminal of a relay 41, the other terminal of the relay being connected to reference point 39.

The normally open contacts 42 and 43 of relay 41 are connected, respectively to reference points 38 and 34.

Reference point 39 is connected through a semiconductor diode 44 to ground, and a second capacitor 45 is connected between reference point 34 and the cathode of diode 44.

Reference point 38 is connected to a conventional turn switch 46 which can make connection to one side of either of the loads R or L, each load being represented as a plurality of tungsten lamps in parallel, the other side of the load being grounded to the vehicle frame and thus connected to the positive terminal of battery 31.

The components of the circuit 30 shown within the broken line rectangle H' are adapted to be enclosed in a box or housing provided with terminals TB, TC and TL connected as shown and adapted for easy connection, respectively, to the negative terminal of battery 31, ground, and switch 46.

In operation, so long as switch S' remains open, and as more fully explained in co-pending application Ser. No. 347,159, filed February 25, 1964, by the same applicant, the circuit is activated by closing the turn switch 46 and connecting reference point 38 with ground and hence the positive side of battery 31 through either load L or R. Battery voltage is applied to base b of transistor 36 through resistors R2 and R4 which form a voltage divider. A current insufficient to light the lamps flows from the battery through resistors R2 and R4, switch 46, and the load.

Resistors R2, R4 and R1 bias the transistor 36 on and the transistor supplies current from its collector electrode c to resistor R3, capacitor 40, and the base electrode B of transistor 35. This collector current charges capacitor 40 exponentially in conjunction with resistor R3 and the voltage differential between base B and reference point 39 increases. Voltage at the emitter E of transistor 35 follows the voltage at base B and the voltage across relay 41 rises accordingly.

While capacitor 40 is charging, the current through load R or L is small and the lamps do not light. When the voltage across relay 41 reaches the operating or "pull-in" voltage of the relay, the contacts 42, 43 close and the full voltage available at the battery is placed across the lamp load and the lamps flash on.

Reference point 34 is now connected directly to the load through contacts 42, 43, of the relay and the voltage across R2 and R4 drops to zero causing transistor 36 to go off. Capacitor 40 now begins to discharge through resistor R3 and transistor 35 and the voltage at the emitter E follows the drop in voltage at the base B until the voltage at the emitter E reaches the release or "drop-out" voltage of the relay. When the relay drops out contacts 42, 43, again open and the the lamps blink out.

As long as switch 46 is closed the above described cycle is repeated and the lamps of load R or L blink on and off.

So long as switch S' remains open the voltage across the battery 31 remains constant as illustrated in FIGURE 3 but, when switch S' is closed and current flows through inverter 33 and the fluorescent lights 32, the voltage at the battery has wide pulsations as illustrated in FIGURE 4.

The diode 44 and capacitor 45 filter out the extreme fluctuations in voltage occasioned by operation of the inverter 33 when switch S' is closed. Capacitor 45 charges at the peak voltages shown in FIGURE 4. During periods of falling voltage, between the peaks, the diode blocks the reverse current flow which would otherwise occur, as hereinabove described in connection with the circuit 10 of FIGURE 1.

In both circuit 10 and circuit 30 the half wave rectifier and filter consisting of the diode (15 or 44) and the capacitor (26 or 45) is inserted between the fluctuating voltage of the power source and the transistor oscillator circuit. The voltage pulsations are reduced to a few tenths of a volt, as illustrated in FIGURE 5, the magnitude of the ripple being controlled primarily by the value of the capacitor and the value of the current drawn by the collector of the PNP transistor.

As will be apparent to those familiar with the art, the invention may be embodied in other specific forms without departing from the spirit or essential characteristics thereof. The embodiments disclosed therefore are to be considered in all respects as illustrative rather than restrictive, the scope of the invention being indicated by the appended claims.

What is claimed is:

1. A transistor oscillator circuit for vehicles having a negatively grounded battery which powers auxiliary electrical equipment causing severe pulsations in the battery voltage, comprising: a first series combination of a load grounded on one side, a switch, a first resistor, a first capacitor and the cathode and anode of a rectifier diode connected in that order across the battery, the junction point of the resistor and capacitor being connected to the base electrode of a transistor; a second series combination of the collector and emitter electrodes of the transistor, and a relay connected from ground to the cathode of the diode; the relay having normally open contacts adapted to complete a circuit when the relay is energized to place substantially the full available potential of the battery across the switch and load, and a second filter capacitor connecting the cathode of the rectifier and the collector electrode of the transistor for flattening out the battery voltage pulsations.

2. The transistor oscillator circuit as defined in claim 1 and having a second resistor which is temperature-sensitive connected in parallel with said first resistor and capacitor in said first series combination.

3. A transistor oscillator circuit for vehicles having auxiliary electrical equipment causing severe voltage pulsations in the vehicle battery which has its positive terminal grounded, comprising: a PNP transistor; a first series combination of the collector and emitter electrodes of the transistor, a relay, and a diode rectifier connected in that order across the battery; a second series combination of a voltage divider, a switch, and a load connected in that order across the battery; an NPN transistor having its base electrode connected to the center point of the divider, its emitter electrode connected through a first resistor to the negative terminal of the battery, and its collector electrode connected to the base electrode of the PNP transistor; a parallel combination of a second resistor and a capacitor connecting the collector-base connection to the cathode of the rectifier; the relay having normally open contacts adapted to complete a circuit when the relay is energized to place substantially the full available potential of the battery across the switch and load; and a second filter capacitor connecting said cathode to the collector electrode of the PNP transistor for flattening out the battery voltage pulsations.

4. A transistor oscillator circuit for vehicles having a battery which powers auxiliary electrical equipment causing severe pulsations in the battery voltage, comprising: a first series combination of the collector and emitter electrodes of a transistor, a relay, the cathode and anode of a rectifier diode connected across the battery, the anode being connected to the positive battery terminal; a parallel combination of a resistor and a first capacitor connecting the base of the transistor to the diode cathode; a second series combination of a load, a switch, and a normally open relay contact connected across the battery; and means for applying charging current from the negative terminal of the battery to the base of the transistor when said relay contact is open, and to discharge said first capacitor when the relay contact is closed; and a second capacitor connecting said diode cathode to the negative terminal of the battery for flattening out the battery voltage pulsations.

References Cited by the Examiner
UNITED STATES PATENTS 3,060,407 10/1962 Beiswenger _____ 340—74
3,113,242 12/1963 Leeder _____ 315—209

FOREIGN PATENTS 875,555 8/1961 Great Britain.

JOHN W. HUCKERT, *Primary Examiner.*

A. J. JAMES, *Assistant Examiner.*